(12) United States Patent
Wessels

(10) Patent No.: US 8,599,066 B1
(45) Date of Patent: Dec. 3, 2013

(54) SYSTEM, METHOD, AND APPARATUS FOR OBTAINING INFORMATION OF A VISUALLY ACQUIRED AIRCRAFT IN FLIGHT

(76) Inventor: Mark A. Wessels, Lewisville, TX (US)

( * ) Notice: Subject to any disclaimer, the term of this patent is extended or adjusted under 35 U.S.C. 154(b) by 0 days.

(21) Appl. No.: 12/568,922

(22) Filed: Sep. 29, 2009

(51) Int. Cl.
*G01S 19/14* (2010.01)

(52) U.S. Cl.
USPC .................................. 342/357.52

(58) Field of Classification Search
USPC .................................. 342/357.52
See application file for complete search history.

(56) References Cited

U.S. PATENT DOCUMENTS

| | | | |
|---|---|---|---|
| 6,173,239 B1 * | 1/2001 | Ellenby | 702/150 |
| 6,181,302 B1 * | 1/2001 | Lynde | 345/7 |
| 6,199,008 B1 * | 3/2001 | Aratow et al. | 701/120 |
| 6,803,887 B1 * | 10/2004 | Lauper et al. | 345/9 |
| 6,958,708 B2 * | 10/2005 | Burg et al. | 340/905 |
| 6,985,240 B2 * | 1/2006 | Benke et al. | 356/614 |
| 7,027,823 B2 * | 4/2006 | Mikuni | 455/457 |
| 7,031,875 B2 * | 4/2006 | Ellenby et al. | 702/150 |
| 7,224,308 B2 * | 5/2007 | Butler et al. | 342/45 |
| 7,295,296 B1 * | 11/2007 | Galli | 356/139.01 |
| 7,471,211 B2 * | 12/2008 | Lemp, III | 340/815.4 |
| 7,518,713 B2 * | 4/2009 | Ash | 356/141.5 |
| 7,634,380 B2 * | 12/2009 | Martin | 702/150 |
| 7,737,965 B2 * | 6/2010 | Alter et al. | 345/419 |
| 2008/0290164 A1 * | 11/2008 | Papale et al. | 235/414 |

FOREIGN PATENT DOCUMENTS

WO   WO 02/073818   *   9/2002 .............. H04B 1/38

* cited by examiner

*Primary Examiner* — Cassie Galt
(74) *Attorney, Agent, or Firm* — Michael Diaz

(57) ABSTRACT

A system, method, and apparatus for obtaining information about an aircraft sighted from the ground. The system includes a communication device for determining an estimated location of the visually acquired aircraft, a flight database for determining information about a specified aircraft based on a provided location, and a network allowing communication between the communication device and the flight database. The communication device provides the estimated location of the sighted aircraft to the flight database and the flight database provides information on the sighted aircraft to the communication device.

14 Claims, 5 Drawing Sheets

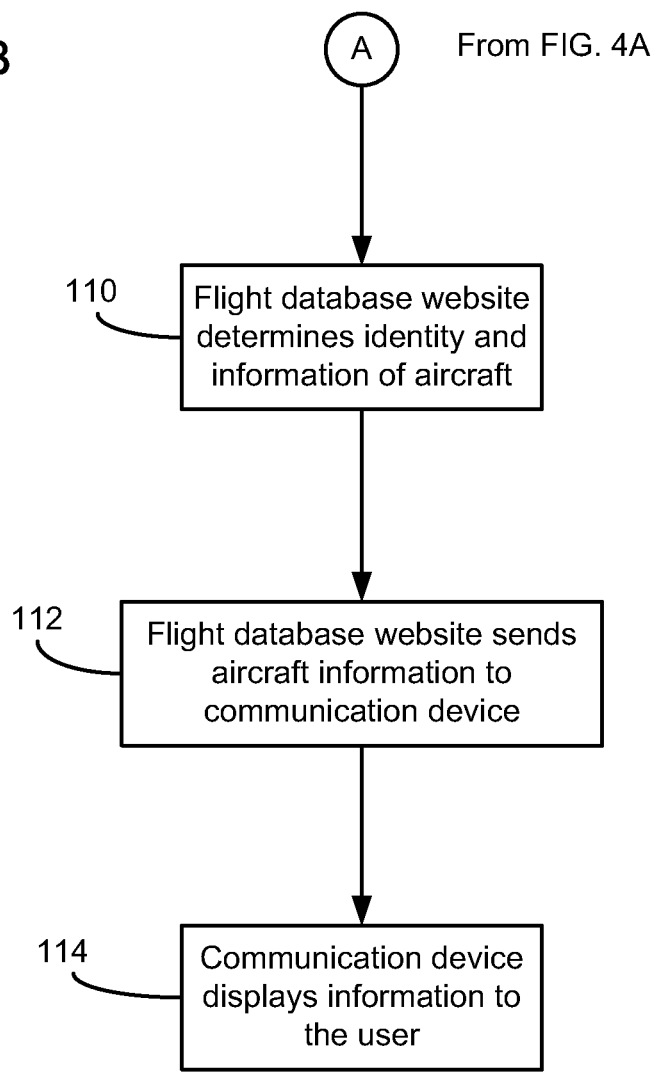

SYSTEM, METHOD, AND APPARATUS FOR OBTAINING INFORMATION OF A VISUALLY ACQUIRED AIRCRAFT IN FLIGHT

BACKGROUND OF THE INVENTION

1. Field of the Invention

This invention relates to aircraft identification. Specifically, and not by way of limitation, the present invention relates to a system, method, and apparatus for obtaining information about an aircraft in flight which is visual sighted from the ground.

2. Description of the Related Art

There are numerous commercial aircraft flying the skies above our nation every day. Because of their speed, the engineering involved, and the constant sight of contrails in the skies overhead, aircraft holds a particular fascination to many people. Oftentimes, people desire to know more information about a particular aircraft flying high above, such as the aircraft's origin, destination, flight number, aircraft type, etc. However, currently, there is no way for an individual, without having access to an Air Traffic Control (ATC) radar display to ascertain this information. It would be advantageous to have a portable device which enables a person to visually locate an aircraft in flight and determine information about that aircraft. It is an object of the present invention to provide such an apparatus, system and method.

SUMMARY OF THE INVENTION

The present invention is a system, method, and apparatus for obtaining information about an aircraft sighted from the ground. In one aspect, the present invention is directed to a system for obtaining information about a visually acquired aircraft. The system includes a communication device for determining an estimated location of the visually acquired aircraft, a flight database for determining information about a specified aircraft based on a provided location, and a network allowing communication between the communication device and the flight database. The communication device provides the estimated location of the sighted aircraft to the flight database and the flight database provides information on the sighted aircraft. In one embodiment, the communication device includes an optical aiming mechanism for visually acquiring an aircraft in flight, a Global Positioning Satellite (GPS) receiver for determining a location of the communication device and current time, an accelerometer for determining an elevation angle, $\alpha$, from a horizon between the communication device and the aircraft, a compass for determining a bearing, $\beta$, between the communication device and the aircraft, and a processor for compiling information determined by the GPS receiver, accelerometer, and compass to derive an estimated location of the aircraft.

In another aspect, the present invention is directed to a method of obtaining information about a visually acquired aircraft. An aircraft is first sighted through a communication device. Next, an estimated location of the aircraft is determined by the communication device. The estimated location of the aircraft is then sent to a flight database. The flight database then determines an identity and information on the aircraft based on the estimated location. The identity and information on the aircraft is subsequently sent to the communication device.

In still another aspect, the present invention is directed to an apparatus for obtaining information about a visually acquired aircraft. The apparatus determines an estimated location of the visually acquired aircraft. The apparatus provides the estimated location of the sighted aircraft to a flight database. The flight database is capable of determining information about a specified aircraft based on a location. The apparatus is then able to receive the determined information from the flight database.

BRIEF DESCRIPTION OF THE DRAWINGS

FIGS. 4A and 4B are flow charts illustrating the steps of obtaining information about a visually acquired aircraft according to the teachings of the present invention.

DESCRIPTION OF THE INVENTION

Figure 1:
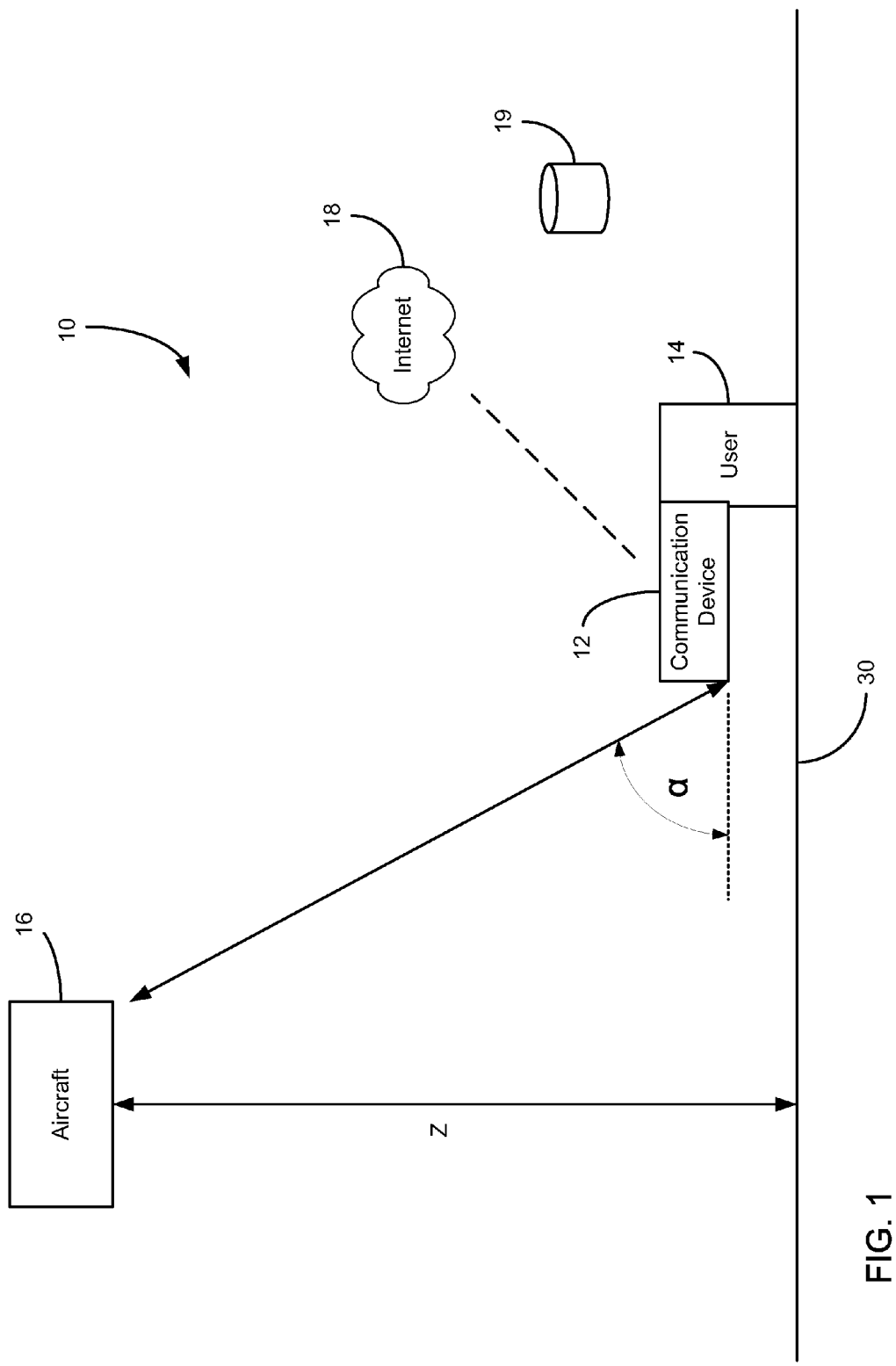
FIG. 1 is a simplified block diagram of the components of a system for obtaining information about a visually acquired aircraft in the preferred embodiment of the present invention.

The present invention is an apparatus, system, and method for obtaining information about an aircraft in flight by a visual sighting from the ground. FIG. 1 is a simplified block diagram of the components of a system 10 for obtaining information about a visually acquired aircraft in the preferred embodiment of the present invention. The system includes a communication device 12 operated by a user 14. The communication device 12 is used to ascertain various types of geometrical information, relative to the communication device, on an aircraft 16 flying at an altitude Z above the ground. In most cases, commercial aircraft travel between 30,000 and 40,000 feet in cruise. The present invention preferably assumes that the sighted aircraft is flying at an altitude between 30,000 and 40,000 feet. However, any altitude may be assumed and still remain within the scope of the present invention.

The communication device 12 may be any device which is capable of communicating through the Internet 18 with one of several publically available flight database websites 19. These flight databases enable users to obtain information on various operating flights. Preferably, the communication device communicates via a wireless connection and is a mobile station (e.g., mobile phone, Personal Digital Assistant (PDA), etc.).

Figure 2:
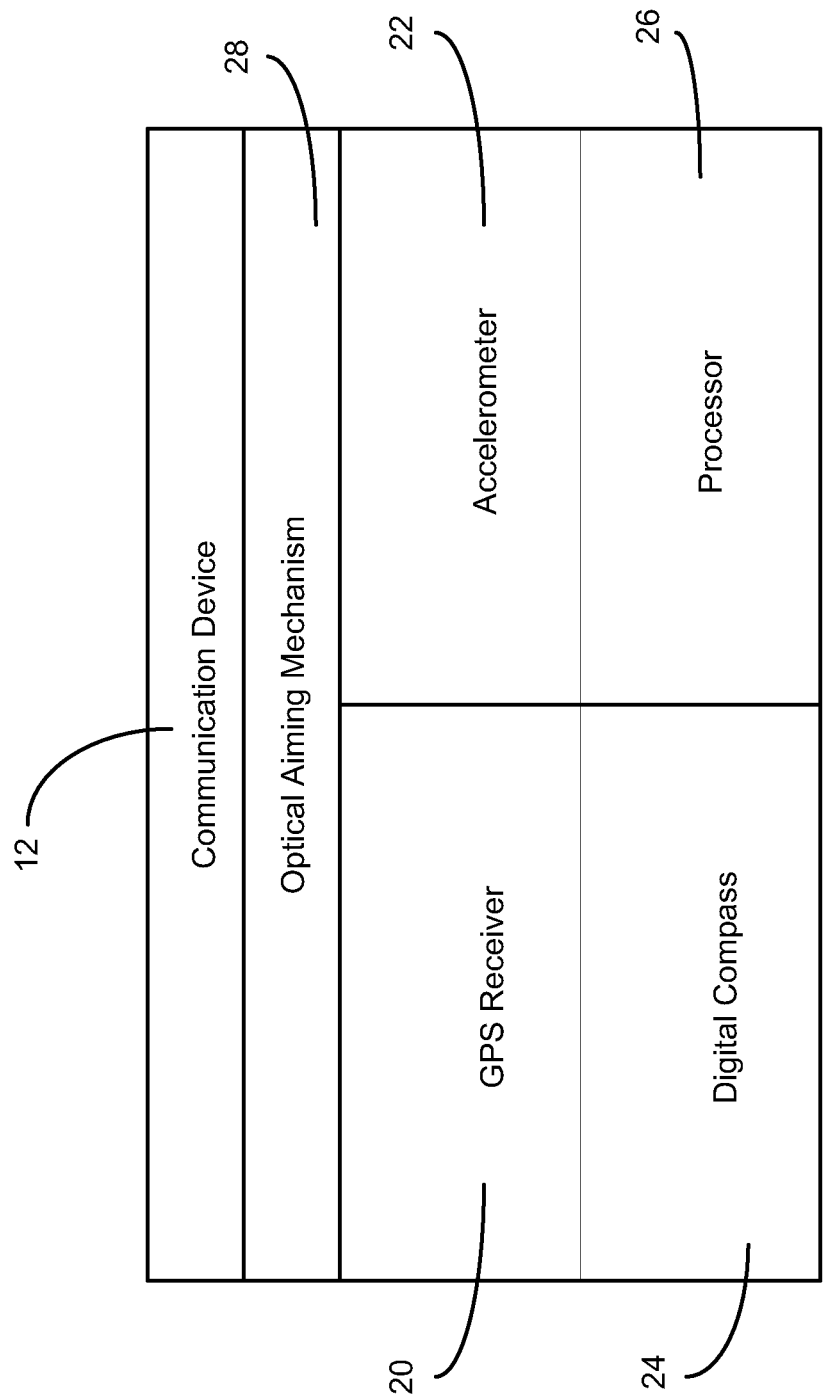
FIG. 2 is a simplified block diagram of the components of the communication device.

FIG. 2 is a simplified block diagram of the components of the communication device 12. The communication device includes a Global Positioning Satellite (GPS) receiver 20, a solid-state accelerometer 22, a digital compass 24, a processor 26, and an optical aiming mechanism 28. All of these components may be found in currently available mobile phones. However, the various components may be separate mechanisms communicating with the processor 26.

The GPS receiver 20 is a receiver for determining the current location of the communication device. Furthermore, the GPS receiver includes a timing device which may be utilized for determining the timing of the sighting of the aircraft 16. The accelerometer 22 is capable of determining an elevation angle $\alpha$ from a horizon 30 to the sighted aircraft 16. The digital compass 24 indicates the azimuth or bearing $\beta$ (see FIG. 3) of the sighted aircraft relative to North. The processor may be any computer processor which is capable of performing calculations from the information provided by the GPS receiver, the accelerometer and the digital compass. The optical aiming mechanism may be a camera view finder or other mechanism for visually aiming the communication device at the aircraft.

Figure 3:
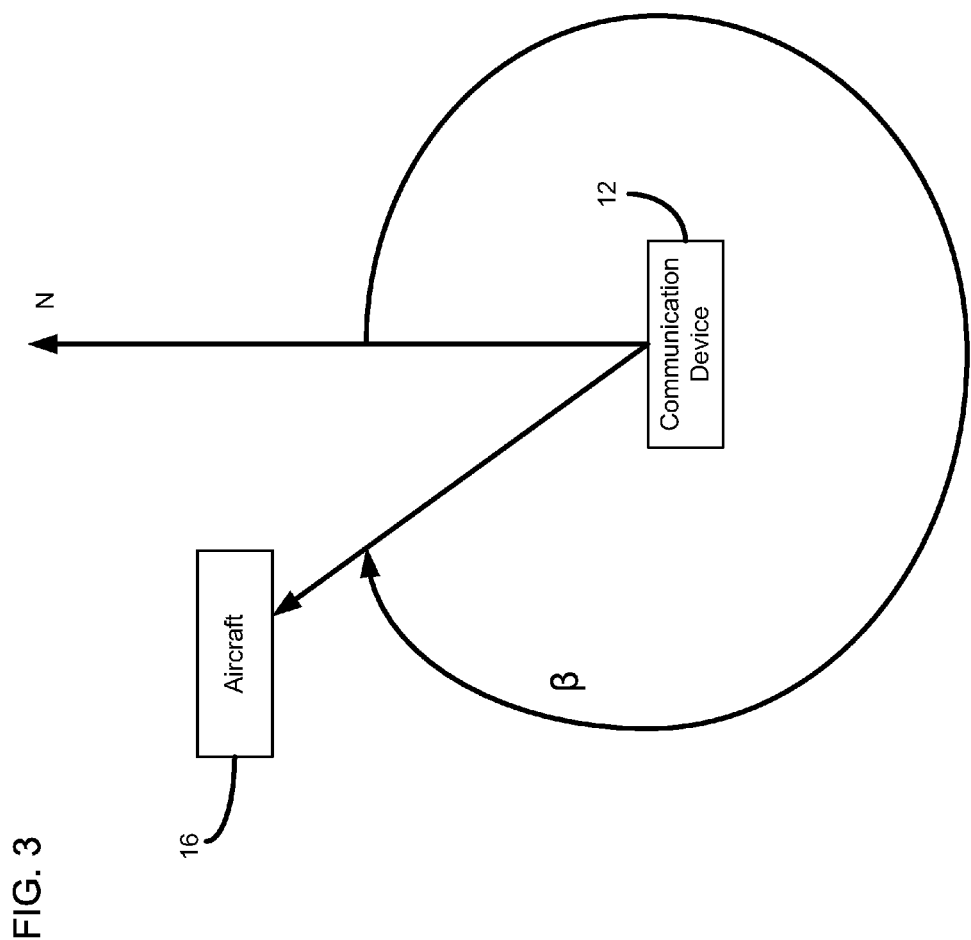
FIG. 3 is a top plan view of the communication device and the relative bearing $\beta$ of the sighted aircraft.

FIG. 3 is a top plan view of the communication device and the relative bearing β of the sighted aircraft 16. The aircraft is sighted at a bearing β. The bearing β may be a magnetic heading originating from the communication device. With the information gathered from the GPS receiver (location of the communication device), the accelerometer (elevation angle α of the aircraft relative to the horizon), the bearing β of the aircraft, and an assumed altitude Z of between 30,000 and 40,000 feet, the processor may ascertain an estimate of the location of the aircraft (i.e., longitude and latitude coordinates).

With reference to FIGS. 1-3, the operation of the system 10 will now be explained. The user 14 sights an aircraft 16 for which the user desires information. The visual acquisition of the aircraft is often easy as commercial aircraft leave contrails at cruising altitudes. The user then aims the optical aiming mechanism 28 at the aircraft 16. The user preferably aims the communication device in a similar fashion as if using a camera to shoot a photograph. The user may then depress a button (not shown) when the position of the communication device is oriented correctly as seen through the optical aiming mechanism 28. The GPS receiver 20 calculates the location of the communication device 12. The elevation angle α is calculated by the accelerometer 22. The digital compass 24 calculates the bearing β of the aircraft from the communication device 12. The altitude Z is preferably estimated to be between 30,000 and 40,000 feet. Utilizing geometrical concepts, a directional ray is computed by the processor 26 from the communication device 12 to the aircraft 16. From this directional ray, the processor may derive an estimate of the aircraft location, preferably in latitudinal and longitudinal coordinates.

The communication device 12 then sends this estimated aircraft location and time of sight (gathered by the GPS receiver) to a flight database website 19, which is available publically via the Internet. By providing this estimated aircraft location and time, the flight database website 19 may provide the identity or possible identities of the aircraft from the flight database website. The website may provide aircraft type, flight number, destination, origin, and other flight information. The website returns this information to the communication device, which then displays the information to the user. Preferably, the communication device includes a display screen for viewing of the information.

Figure 4A:
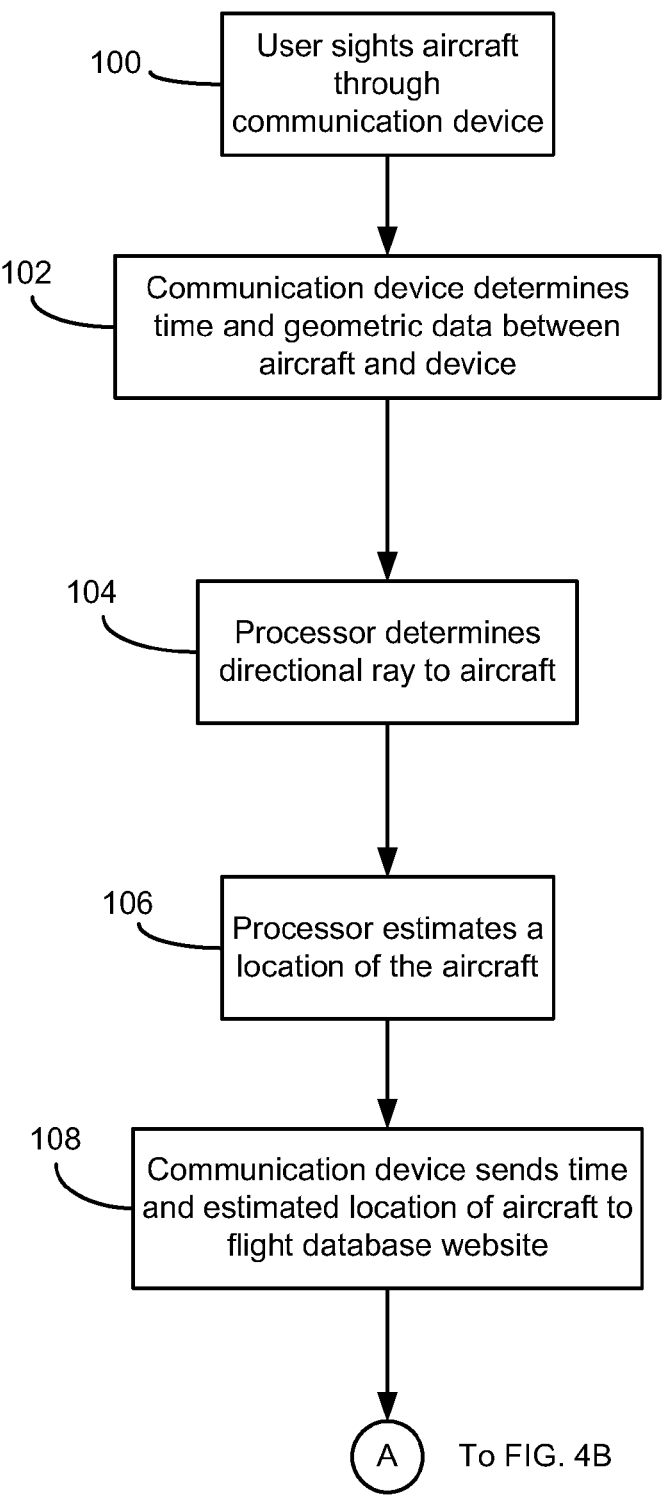

FIGS. 4A and 4B are flow charts illustrating the steps of obtaining information about a visually acquired aircraft according to the teachings of the present invention. With reference to FIGS. 1-4, the method will now be explained. In step 100, the user 14 sights an aircraft 16 for which the user desires information. The visual acquisition of the aircraft is often easy as commercial aircraft leave contrails at altitude. The user then aims the optical aiming mechanism 28 at the aircraft 16. The user preferably aims the communication device in a similar fashion as if using a camera to shoot a photograph. The user may then depress a button when the position of the communication device is oriented correctly as seen through the optical aiming mechanism 28. The depression of the button actuates the various components of the communication device to obtain requested information. Next, in step 102, the communication device determines the current time and various geometrical data between the communication device and the sighted aircraft. The GPS receiver 20 calculates the location of the communication device 12 and time of sighting. The elevation angle α is calculated by the accelerometer 22. The digital compass 24 calculates the bearing β of the aircraft from the communication device 12. The altitude Z is preferably estimated to be between 30,000 and 40,000 feet. Next, in step 104, the processor 26 determines a directional ray from the communication device 12 to the aircraft 16. In step 106, from this directional ray, the processor may derive an estimate of the aircraft location, preferably in latitudinal and longitudinal coordinates.

In step 108, the communication device 12 then sends this estimated aircraft location and time of sight to the flight database website 19. In step 110, the fight database website determines the identity or possible plurality of identities of the aircraft from the flight database. The website may provide aircraft type, flight number, destination, origin, and other flight information. In step 112, the website 19 returns this information to the communication device. In step 114, the communication device displays the received information to the user. Preferably, the communication device includes a display screen for viewing of the information.

The present invention provides a system and method of ascertaining an identity of an aircraft from a visual sighting. The present invention enables a user to sight an aircraft, determine an estimated location of the aircraft, send the information to a flight database, and receive information on the aircraft from the database.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for obtaining information about a visually acquired airborne aircraft dynamically moving, the system comprising:

a communication device, the communication device having means for determining an estimated location of the visually acquired aircraft, the aircraft being airborne and dynamically changing location;

wherein the means for determining an estimated location includes:

an optical aiming mechanism configured to visually acquire the aircraft;

a Global Positioning Satellite (GPS) receiver configured to determine a location of the communication device and current time:

an accelerometer configured to determine an elevation angle, α, from a horizon between the communication device and the aircraft;

a compass configured to determine a bearing, β, between the communication device and the aircraft; and a processor configured to compile information determined by the GPS receiver, accelerometer, and compass, and to use said information and an assumed altitude between 30,000 and 40,000 feet to derive an estimated location of the aircraft;

a flight database configured to determine information about a specified dynamically moving aircraft based on a location, the flight database having continually updated location information on a plurality of moving aircraft in a specific area; and a network allowing communication between the communication device and the flight database;

the communication device having means for communicating with the flight database through the network;

wherein the communication device is configured to provide the estimated location of the aircraft to the flight database and the flight database is configured to provide information on the aircraft.

2. The system according to claim 1 wherein the compass is a digital compass providing a magnetic bearing, $\beta$, from the communication device to the aircraft.

3. The system according to claim 1 wherein the accelerometer is a solid-state accelerometer.

4. The system according to claim wherein the estimated location is provided in longitudinal and latitudinal coordinates.

5. The system according to claim 1 wherein the communication device includes a display for displaying information received from the flight database.

6. A method of obtaining information about a visually acquired airborne aircraft dynamically moving, the method comprising the steps of:
    sighting an airborne aircraft dynamically changing location through an optical aiming mechanism of a communication device;
    determining an estimated location of the aircraft by the communication device;
    wherein the step of determining an estimated location of the aircraft includes the steps of:
        determining a location of the communication device and current time using a Global Positioning Satellite (GPS) receiver of the communication device;
        determining an elevation angle, $\alpha$, from a horizon between the communication device and the aircraft using an accelerator of the communication device;
        determining a bearing, $\beta$, between the communication device and the aircraft using a compass of the communication device; and
        using a processor to compile information determined by the GPS receiver, accelerometer, and compass, and to determine the estimated location of the aircraft using said information and an assumed altitude between 30,000 and 40,000 feet;
    sending the estimated location of the aircraft to a flight database;
    determining, by the flight database, an identity and information on the aircraft based on the estimated location, the flight database having continually updated location information on a plurality of moving aircraft in a specific area; and
    sending the identity and information on the aircraft to the communication device.

7. The method according to claim 6 wherein the compass is a digital compass providing a magnetic bearing, $\beta$, from the communication device to the aircraft.

8. The method according to claim 6 wherein the accelerometer is a solid-state accelerometer.

9. The method according to claim 6 wherein the estimated location is provided in longitudinal and latitudinal coordinates.

10. The method according to claim 6 further comprising the step of displaying information received from the flight database on the communication device.

11. An apparatus for obtaining information about a visually acquired airborne aircraft dynamically moving, the apparatus comprising:
    means for determining an estimated location of the visually acquired aircraft, the aircraft being airborne and dynamically changing location;
    wherein the means for determining an estimated location of the visually acquired aircraft includes:
        an optical aiming mechanism configured to visually acquire the aircraft;
        a Global Positioning Satellite (GPS) receiver configured to determine a location of the apparatus and current time;
        an accelerometer configured to determine an elevation angle, $\alpha$, from a horizon between the apparatus and the aircraft;
        a compass configured to determine a bearing, $\beta$, between the apparatus and the aircraft; and
        a processor configured to compile information determined by the GPS receiver, accelerometer, and compass, and to use said information and an assumed altitude between 30,000 and 40,000 feet to derive an estimated location of the aircraft;
    means for communicating with a flight database, the flight database determining information about a specified dynamically moving aircraft based on a location, the flight database having continually updated location information on a plurality of moving aircraft in a specific area;
    wherein the apparatus is configured to provide the estimated location of the aircraft to the flight database and to receive information on the aircraft from the flight database.

12. The apparatus according to claim 11 wherein the accelerometer is a solid-state accelerometer.

13. The apparatus according to claim 11 wherein the estimated location is provided in longitudinal and latitudinal coordinates.

14. The apparatus according to claim 11 further comprising a display for displaying information received from the flight database.

* * * * *